June 14, 1966     P. L. PETERSCHMIDT     3,255,721
COMPOSITE STRUCTURE UTILIZING NOVEL ASSEMBLING JOINT
Filed Jan. 2, 1964     2 Sheets-Sheet 1
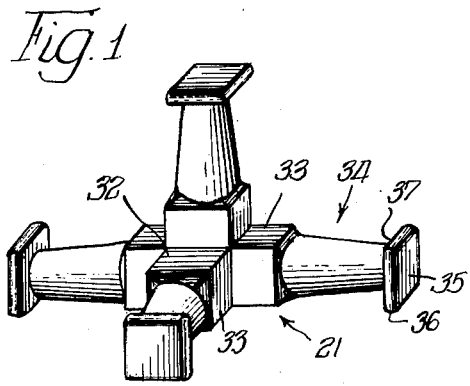
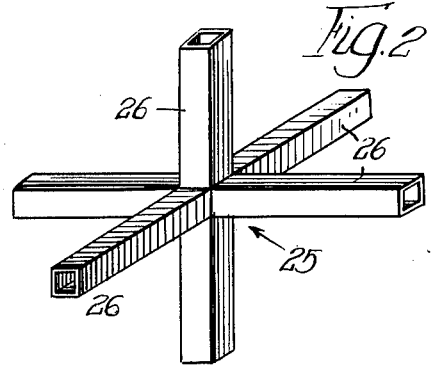
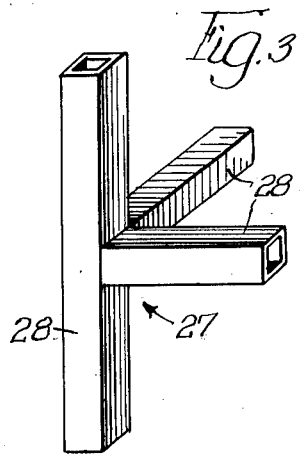
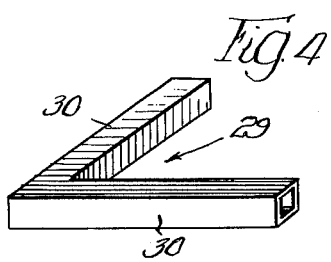
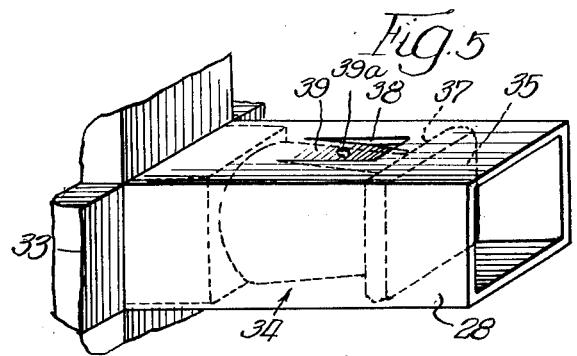
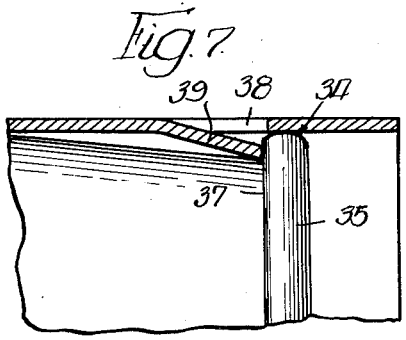
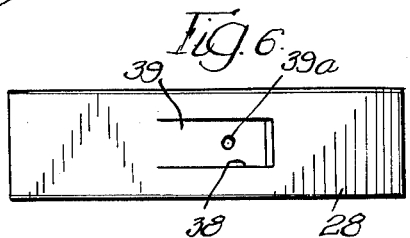
INVENTOR.
Paul L. Peterschmidt,
BY
Byron, Hume, Groen + Clement

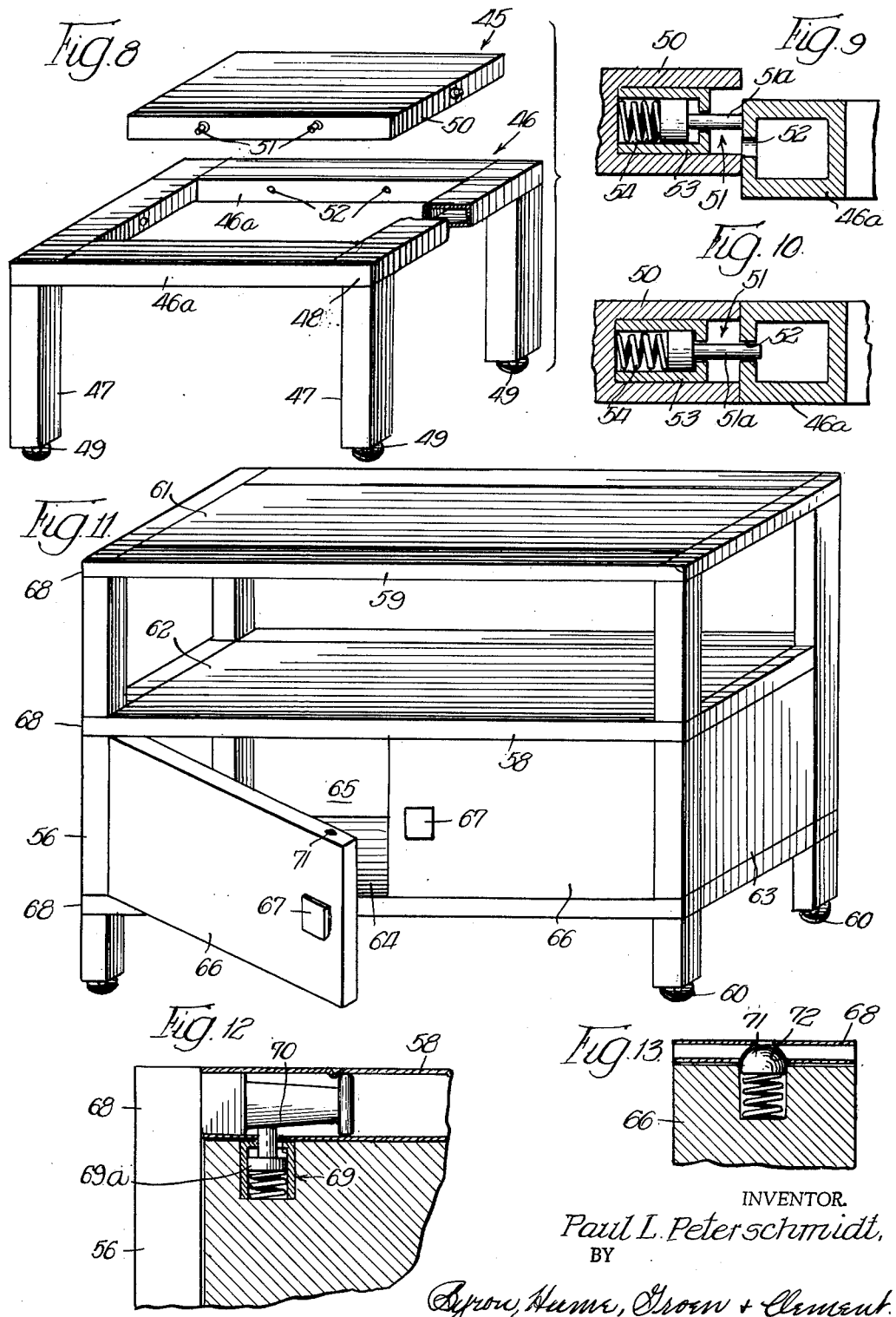

United States Patent Office 3,255,721
Patented June 14, 1966

3,255,721
COMPOSITE STRUCTURE UTILIZING NOVEL ASSEMBLING JOINT
Paul L. Peterschmidt, Deerfield, Ill., assignor to Diversification Development Inc., Chicago, Ill., a corporation of Illinois
Filed Jan. 2, 1964, Ser. No. 335,270
2 Claims. (Cl. 108—111)

This invention relates to composite structures and more particularly to improved structures employing an assembling joint arrangement similar to that disclosed and claimed in the copending application of Poul Cadovius, Serial No. 89,186, filed February 14, 1961, now Patent No. 89,186.

In the aforementioned copending application, there is described a novel assembling joint for assembling a framework comprising supports in the form of tubular rods. The assembling joint is provided with one or more supporting pin members which can be slid the end of a tubular rod in spigot and socket fashion. The tubular rod can be a rod of any adequate cross section and being hollow at least at both ends. In this assembling joint, a special design is used with respect to the supporting pin members which permits the joint to be pivoted relative to the tubular rods during asssembly. The pin members are provided with a root portion adapted to fit within a tubular rod and having an outwardly extending portion, the outer end of which has a surface configuration fitting within the tubular rod but permitting rotation of the pin member relative to the longitudinal axis of the tubular rod during assembly. The portion of the pin member intermediate the outer portion and the root portion is of reduced diameter to facilitate rotation of the supporting pin member relative to the tubular rod.

In such joint assemblies and structures assembled therewith, it is desirable to provide panels or other members supported by the tubular structure which readily clip onto said tubular rods to secure the same against disassembly.

Therefore, it is an object of this invention to provide a new and improved composite structure (e.g. furniture structures) employing assembling joints as described above, which structures are stable and yet susceptible to rapid assembly and disassembly.

Other objects and advantages of this invention will become apparent from the following detailed description thereof, when considered in conjunction with the accompanying drawings wherein:

FIGURE 1 is a perspective view of a joint member used in the composite structures of the present invention;

FIGURE 2 is a perspective view of one type of joint assembly for such structures which employs square or rectangular tubing;

FIGURE 3 is a perspective view of another joint assembly;

FIGURE 4 is a perspective view of still another joint assembly;

FIGURE 5 is a detail view illustrating a preferred locking arrangement used in the joint assemblies depicted in FIGS. 2–4;

FIGURE 6 is a plan view of the arrangement shown in FIG. 5;

FIGURE 7 is an enlarged fragmentary cross-sectional view taken along the longitudinal axis of the tubing member shown in FIG. 5 so as to more clearly illustrate the locking arrangement depicted therein;

FIGURE 8 is an exploded view of a composite table structure including a table panel and a base framework formed of joint assemblies of the type depicted in FIGURES 2–4;

FIGURES 9 and 10 illustrate a locking arrangement for supporting the table panel in the base framework of the composite table structure depicted in FIG. 8;

FIGURE 11 is a perspective view of a table-cabinet structure utilizing panels, doors and a framework that are assembled in accordance with the present invention;

FIGURE 12 shows a detail view of a preferred hinge arrangement for the doors of the table-cabinet structure; and FIGURE 13 illustrates one embodiment of a stop arrangement for the doors of the table-cabinet structure depicted in FIG. 11.

Quite generally, the present invention relates to composite structures (e.g. furniture structures) employing tubing that is mated with assembling joints to provide suitable frameworks that can be rapidly assembled and disassembled. The invention further contemplates suitable locking arrangements for the coacting elements of the framework and for joining panel and/or door members to such a framework so that furniture structures can be readily fabricated.

FIG. 1 shows a joint member 21 similar to those disclosed and claimed in the aforementioned Cadovius application, and FIGS. 2–4 illustrate a number of joint assemblies 25, 27 and 29 that employ such a joint member in conjunction with square or rectangular tubing. More particularly, FIG. 2 shows a joint assembly 25 in which six tubes 26 of square cross section meet and are supported by a joint member 21, FIG. 3 shows a similar joint assembly 27 for four square tubes 28, and FIG. 4 illustrates a joint assembly 29 wherein a pair of tubes 30 are joined at a right angle by a member 21.

Preferably, the joint member 21 comprises a central supporting portion 32 having root portions 33 of slightly tapered and substantially square cross section formed thereon. This member is also provided with a plurality of outwardly extending pin members 34 having outer portions 35 formed with an exterior configuration that corresponds to that of the root portions 33. Preferably, the peripheral surfaces 36 of the outer portions 35 have a generally arcuate configuration that permits pivoting of the pin member 34 relative to tubular elements 26, 28, or 30 during assembly as described and claimed in the aforementioned copending application.

When the square tubing is fitted over root portion 33 and outer end portion 35 (see FIG. 5) there is provided a rigid support for the tubing and the tubing is preferably secured to the joint member 21 by a suitable locking arrangement (FIGS. 5–7) that bears against an inner surface 37 of the outer portion of the pin member 34. In this connection and referring to FIG. 5, one of the pin members 34 is illustrated as being positioned within a segment of square tubing 28. This segment of tubing is provided with a cut-out portion 38, from one edge portion of which a somewhat resilient tang 39 extends so as to engage the inner surface 37 of the outer portion 35 of the pin member. This arrangement is operable to lock the segment of tubing 28 in engagement with the joint member 21 as shown in greater detail in FIGS. 6 and 7. Preferably, the tang 39 has an aperture 39a formed therein to allow the insertion of a conventional tool, the lifting of the tang, and the unlocking of the tubing and joint member.

The joint member shown in FIG. 1 is the particular one required for the fabrication of the joint assembly 27 which is depicted in FIG. 3. It should be obvious to those skilled in the art that other joint assemblies can be made by increasing or decreasing the number of outwardly extending pin members 34 and/or by changing the angle between the respective pin members to correspond to the desired structure. Thus, the joint member 21 for the assembly shown in FIG. 2 has six outwardly extending pin members and the joint member for the assembly shown in FIG. 4 has only two outwardly extending pin members. Where the structure requires the supporting tubing to meet at other than right angles, the joint members 31 employed therein would be formed with the pin members 34 located at the appropriate angle relative to each other.

The joint assemblies shown in FIGS. 2, 3 and 4 make possible the fabrication of a large variety of composite structures from stock parts in a manner which was previously quite difficult. In this connection, these assemblies make possible the construction of a variety of modular units including, for example, divider panels for temporary partitions, industrial shelving, and various items of furniture.

FIGS. 8–13 depict typical composite furniture structures fabricated in accordance with the present invention and utilizing assemblies of the type shown in FIGS. 1–7. More particularly, FIG. 8 depicts a table or desk structure 45 utilizing square tubing and joint members of the type shown in FIG. 1. The desk includes a framework 46 comprising a plurality of joined tubular elements 46a and from which there depend four vertically extending tubular legs 47. The legs 47 are joined to framework 46 by joint members 48 that have a configuration similar to that of member 21 (FIG. 1) but including only three projecting pin members 34.

The joining of the elements 46a and the legs 47 through the use of the members 48 is preferably effected so that these elements are held in a fixed position; therefore, the locking arrangement shown in FIGS. 5–7 can be employed in this framework. The lower ends of the legs 47 are shown as being provided with leveling screws 49; however, these are optional. A panel 50 forms the horizontal surface of the structure 45. This panel, which is typically flat and formed of wood, metal, plastic, or other suitable material, is preferably provided with a plurality of spring-loaded, plunger-type fasteners 51 having a spring biased pin member 51a that cooperate with apertures 52 formed in the tubular elements 46a to facilitate the mounting of the panel and the fabrication of the composite structure.

The details of the plunger-type fasteners and their relation to the tubular elements of the framework are best illustrated in FIGS. 9 and 10. In this connection, the fasteners 51 are mounted within guide members 53 and the pin member 51a of each is resiliently biased in an outwardly extending position by springs 54. To effect the joining of the panel 50 to the framework 46, the pin members 51a are depressed as shown in FIG. 9. After the panel is moved into position, these pin members are biased into the apertures 52 that are aligned therewith as shown in FIG. 10, and the panel is thereafter maintained in fixed relation with respect to the framework. Preferably, the underside of the panel 50 and each of the guide members 53 are provided with suitable aligned slots or openings (not shown) which allow access to the pin members 51a and facilitate the selective movement thereof so that the panel 50 can be removed from the framework when desired.

FIGS. 11–13 illustrate the application of the invention to the assembly of a composite table-cabinet structure which includes doors pivoted on a supporting framework. In this connection, FIG. 11 illustrates a number of different structural features which may be embodied in other structures fabricated in accordance with the present invention.

More particularly, FIG. 11 depicts a combination table and cabinet structure 55 having vertically extending legs 56 and horizontally extending framework defining elements 57, 58, and 59 respectively. The legs 56 may be provided with leveling screws 60. A pair of upper panels or shelves 61 and 62, which may be formed of wood, metal, plastic or the like, are preferably mounted with the framework defined by the elements 56–59 by plunger-type fasteners similar to those employed in the structure shown in FIGS. 8–10. A pair of end panels 63, a back panel 64 and a bottom panel 65 are similarly mounted within the framework.

A pair of front door panels 66, each of which is provided with a handle 67, are hinged in conventional side-by-side relationship adjacent the outer edge of the cabinet. The hinge arrangement for each of the doors 66 is preferably a pair of plunger-type fittings 69 as shown in FIG. 13, one of which is located at the upper inner end of each door panel and the other at the lower inner end. Each of the hinges 69 preferably has a spring biased, plunger-type construction similar to that described in connection with FIGS. 8–10 so that the spring biased mounting element 69a of each extends through and is confined with an aperture 70 provided in the adjacent framework defining tubular elements.

In addition to the spring biased hinge contraction 69 each of the door panels is preferably provided with at least one spring-loaded stop element 71 that is located in the upper portion of the panel adjacent the outer edge thereof. The spring-loaded stop 71 bears against an aperture 72 in the bottom edge of the tubular element 68 to secure the door 66 in closed position as shown in FIG. 13.

It should be understood that the foregoing is merely illustrative of the invention. In this connection, a variety of composite structures can be fabricated in accordance with the present invention other than those specifically described herein. For example, tubular frameworks might be constructed in modular form so as to define supporting structures for temporary partitions, industrial shelving and the like. When utilized in these applications as well as in connection with the fabrication of furniture structures, the peripheral surfaces of the tubular elements can be extruded or otherwise suitably formed with grooved regions to accommodate panel members, sliding doors, drawers, etc., without utilizing fasteners such as the plunger type fasteners 51.

Additionally, composite structures can be fabricated with panel sections wherein the plunger type fasteners (e.g. similar to the fasteners 51) not only mount the panels within the framework but also serve to effect the locking of the various tubular segments in engagement with the joint members that define the framework. That is, the fasteners can be located along the edge portions of the panel members so that the spring biased pin members thereof (e.g. similar to the pin members 51a) pass through apertures formed in the tubular elements when the shelving is placed in position and engage the inner surface of the outer portion of the pin member over which the panel supporting tubing segments are fitted.

These changes and other various modifications of the embodiments disclosed herein clearly do not constitute a departure of the invention, various features of which are set forth in the accompanying claims.

What is claimed is:

1. A composite framework structure wherein panel members are supported between selected ones of the framework defining members, which structure comprises a plurality of tubular load bearing elements having a square cross-sectional configuration and having a plurality of fitting receiving apertures provided in at least one wall surface thereof, a plurality of joint elements coupled to said tubular load bearing elements so as to define a plurality of load bearing joints and effect the formation of a framework structure of preselected configuration, each of said joint elements having a root portion and at least one pin member that extends outwardly from said root portion, each of said pin members having outer and inner portions of square cross-sectional configuration that are proportioned to be fitted within an end portion of one each of said tubular elements and having an intermediate portion of reduced diameter, the outer portion of each of said pin members being formed in the direction of the longitudinal axis with a generally arcuate peripheral surface and in conjunction with said intermediate portion to facilitate the angular disposition of said pin members relative to the longitudinal axis of said tubular elements during the joining of said elements to said pin members, resilient locking means provided adjacent the end of each of said tubular elements and engageable with said outer portion of said pin member fitted therein so that longitudinal movement of said pin members within said tubular elements is precluded, and a plurality of panel members, said panel members being proportioned so as to fit flush between selected ones of said tubular load bearing elements that define said framework structure and having spring loaded plunger-type fittings provided in the edge portions thereof that engage and mate with said fitting receiving apertures.

2. A composite framework structure in accordance with claim 1 wherein selected ones of said spring loaded plunger-type fittings engage the outer portion of each of said pin members when said fittings are received within said apertures thereby effecting the further locking of said pin members within said tubular load bearing elements.

References Cited by the Examiner

UNITED STATES PATENTS

| | | | |
|---|---|---|---|
| 278,346 | 5/1883 | Long | 287—119 |
| 1,052,077 | 2/1913 | McMillan | 287—119 |
| 1,929,869 | 10/1933 | Hassner | 287—119 |
| 2,063,895 | 12/1936 | Mack. | |
| 2,533,763 | 12/1950 | Cacciotti. | |
| 2,875,815 | 3/1959 | Gill | 297—153 |
| 3,008,741 | 11/1961 | MacCormack. | |
| 3,087,768 | 4/1963 | Anderson et al. | |
| 3,155,405 | 11/1964 | Cadovius. | |

FOREIGN PATENTS 249,602   4/1948   Switzerland.

CARL W. TOMLIN, *Primary Examiner.*

I. B. TALTON, D. W. AROLA, *Assistant Examiners.*